(12) United States Patent
Weber et al.

(10) Patent No.: US 12,120,034 B2
(45) Date of Patent: Oct. 15, 2024

(54) DATA FLOW CONTROL IN A NETWORK

(71) Applicant: B&R INDUSTRIAL AUTOMATION GMBH, Eggelsberg (AT)

(72) Inventors: Horst Weber, Eggelsberg (AT); Franz Meisl, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 18/030,659

(22) PCT Filed: Oct. 18, 2021

(86) PCT No.: PCT/EP2021/078759
§ 371 (c)(1),
(2) Date: Apr. 6, 2023

(87) PCT Pub. No.: WO2022/084222
PCT Pub. Date: Apr. 28, 2022

(65) Prior Publication Data
US 2023/0421505 A1    Dec. 28, 2023

(30) Foreign Application Priority Data
Oct. 19, 2020    (AT) ............... A 50894/2020

(51) Int. Cl.
*G06F 15/16*    (2006.01)
*H04L 47/26*    (2022.01)
(Continued)

(52) U.S. Cl.
CPC ......... *H04L 47/266* (2013.01); *H04L 47/283* (2013.01); *H04L 47/30* (2013.01)

(58) Field of Classification Search
CPC ..................................................... H04L 47/30
See application file for complete search history.

(56) References Cited

U.S. PATENT DOCUMENTS

| 6,570,848 B1 | 5/2003 | Loughran et al. |
| 2008/0232251 A1* | 9/2008 | Hirayama ............... H04L 47/10 370/235 |

(Continued)

FOREIGN PATENT DOCUMENTS

| DE | 696 27 240 | 1/2004 |
| EP | 0 404 337 | 12/1990 |

(Continued)

OTHER PUBLICATIONS

Austria Search Report conducted in counterpart Austria Appln. No. A 50894/2020 (Jun. 21, 2021).
(Continued)

*Primary Examiner* — Joseph R Maniwang
(74) *Attorney, Agent, or Firm* — GREENBLUM & BERNSTEIN, P.L.C.

(57) ABSTRACT

In order to implement a method for data flow control in a network with reduced overhead, a first subscriber transmits data symbols in data frames to a second subscriber. The second subscriber forwards and/or processes the data frame. If there is a delay in forwarding and/or processing the data frame, the second subscriber instructs the first subscriber to pause the transmission of the data frames with a granularity of one data symbol. After the pause, the first subscriber continues to transmit the data frames with a granularity of one data symbol.

3 Claims, 2 Drawing Sheets

(51) Int. Cl.
    *H04L 47/283*     (2022.01)
    *H04L 47/30*     (2022.01)

(56) References Cited

U.S. PATENT DOCUMENTS

| | | | | |
|---|---|---|---|---|
| 2009/0245090 A1* | 10/2009 | Budianu | ............... | H04J 11/00 |
| | | | | 370/210 |
| 2013/0287128 A1 | 10/2013 | Park et al. | | |
| 2016/0173383 A1* | 6/2016 | Liu | ............... | H04L 47/29 |
| | | | | 370/235 |
| 2019/0246315 A1* | 8/2019 | Kilian | ............... | H04W 52/0229 |
| 2022/0029927 A1* | 1/2022 | Hung | ............... | H04W 74/0816 |

FOREIGN PATENT DOCUMENTS

| | | |
|---|---|---|
| EP | 2 278 757 | 1/2011 |
| GB | 2 348 580 | 10/2000 |
| WO | 01/89121 | 11/2001 |
| WO | 2006/134537 | 12/2006 |

OTHER PUBLICATIONS

Int'l Search Report (Form PCT/ISA/210) conducted in Int'l Appln. No. PCT/EP2021/078759 (Jan. 25, 2022).

Int'l Written Opinion (Form PCT/ISA/237) conducted in Int'l Appln. No. PCT/EP2021/078759 (Jan. 25, 2022).

\* cited by examiner

DATA FLOW CONTROL IN A NETWORK

The present invention relates to a method for data transmission in a network, wherein a first subscriber transmits data symbols in data frames to a second subscriber and the second subscriber forwards and/or processes the data frame. The present invention further relates to a network comprising a first subscriber and a second subscriber connected to the first subscriber via a data connection, wherein the first subscriber is designed to transmit data symbols in data frames to the second subscriber via the data connection.

A fundamental distinction is made between standard networks and real-time networks, wherein data frames are transmitted spontaneously between subscribers in standard networks, and data frames are transmitted cyclically between subscribers in real-time networks. A data frame starts with a start header, comprises a plurality of data symbols and ends with an end header. Data symbols are therefore the actual user data being transported in a data frame. A subscriber which has received a data frame buffers said data frame in its entirety in a store-and-forward buffer, or a portion of said data frame in a cut-through buffer. The buffering of entire data frames and subsequent forwarding of these entire data frames is referred to as "store-and-forward". "Cut-through", on the other hand, refers to the buffering of only a portion of the data frames in question, which buffering is required for the decision as to where (i.e. via which destination port) the data frame is to be forwarded. This portion can for example comprise a few bytes and is preferably arranged at the start of the data frame. After the destination port has been determined, the buffered part of the data frame and the other part of the data frame are sent to the corresponding destination port. As the smallest possible portion of a data frame is buffered and then forwarded in the case of "cut-through"—wherein the remaining portion of the data frame is forwarded directly and without buffering—the throughput time can be reduced. The data frames buffered in the cut-through buffer or store-and-forward buffer (hereinafter generally referred to as the switch buffer) are then processed (if the destination port is an internal port) and/or forwarded (if the destination port is an external port) by the subscriber and then removed from the switch buffer again.

In real-time networks, as well as standard networks, the case may arise that after receiving a data frame, there is a delay in processing or forwarding, for example because subscribers have a different clock. If data frames are transmitted from a subscriber with a faster clock to a subscriber with a slower clock, the case may arise that the subscriber with a slower clock receives data frames with a faster clock (the clock of the sending subscriber) than the receiving subscriber can process/forward them (its own clock), which means that a symbol buffer downstream of the switch buffer can overflow.

In real-time networks, as well as standard networks, the case may arise that a subscriber (e.g. a switch) receives data frames at several ports and is supposed to forward these data frames via one port. In this case, the case can arise that said subscriber receives data frames faster than they can be transmitted or processed, which also results in a delay. A symbol buffer of the receiving subscriber can also overflow.

In order to prevent a symbol buffer from overflowing, data flow controls are implemented in real-time networks and standard networks, which data flow controls are used to control the transmission of data frames between subscribers as efficiently and with as little loss as possible.

A data flow control can also be required in real-time networks and standard networks in order to control the assignment of data frames to a subscriber if the subscriber receives data frames simultaneously at several ports and is supposed to send data frames to at least one other port. An internal port, for example, which enables processing in the subscriber, can be provided as the other port. An external port, which enables forwarding to other subscribers, can also be provided as the other port. When using a data flow control, each data frame does not have to be planned individually and explicitly, which means that the available bandwidth in the real-time network can be used efficiently.

A real-time network configured according to the TSN IEEE 802.1Qbu standard has, for example, a time-controlled data flow control. In this case, a switch assigns each subscriber a cyclically repeating transmission period for sending data frames, wherein real-time network switches which are configured accordingly are provided. This time-controlled data flow control is relatively complicated, since it must be ensured that no data packets sent by different subscribers overlap.

With regard to data flow control, a distinction is made between on/off procedures and credit-based procedures. In the case of on/off procedures, the receiving subscriber informs the sending subscriber when said receiving subscriber is ready to receive data frames (on), whereupon the sending subscriber begins to send the data frames. As soon as the receiving subscriber can no longer receive data frames, for example because its symbol buffer is completely full, said receiving subscriber signals to the sending subscriber to pause the transmission of the data frames (off). For this purpose, explicit control signals (e.g. RTS and CTS for RS-232 or IRDY and TRDY for PCI) are transmitted on separately designed control lines, which is referred to as out-of-band signaling. However, special control symbols are also used (e.g. ASCII codes for X-On/X-Off, pause frame for Ethernet IEEE802.3x), which is referred to as in-band signaling.

In the case of credit-based methods, the receiving subscriber informs the sending subscriber at certain time intervals how many data frames (credits) can still be received. The sending subscriber sends data frames accordingly and stops the transmission according to a predetermined number of data frames, provided that in the meantime said sending has not received new information from the receiving subscriber regarding data frames to be received. Information regarding credits is usually transmitted in-band (e.g. PCIe).

In Ethernet networks, on the other hand, the current data frame (including headers) is sent in its entirety, whereby a transmission pause occurs only after the data frame has been completely transmitted, i.e. no more frames are sent. Data flow control, especially in modern serial networks, usually affects entire data frames, which means that a frame is only sent in its entirety (including headers) or not sent. The granularity is therefore coarse and the responsiveness sluggish.

For example, in a real-time network configured according to the TSN IEEE 802.1Qbu standard, it is possible to prioritize data frames, wherein low-priority data frames can be split up in order to send higher-priority data frames. However, this division takes place in such a way that the relevant data frame is divided into smaller data frames. Additional headers are added at the start and end of the respective smaller data frames, which means that a CRC (cyclic redundancy check) etc. must also be created, which creates additional overhead. As mentioned, the data flow control is also time-controlled in this case, which means that a cyclically repeating transmission period is specified for each subscriber, wherein data frames can also be interrupted cyclically, for example.

It is the object of the present invention to specify a method for data flow control, wherein overhead is reduced.

This object is achieved by a method, in which, in the event of a delay in the forwarding and/or processing of the data frame, the second subscriber instructs the first subscriber to pause the transmission of the data frames with a granularity of one data symbol, wherein after the pause, the first subscriber continues to transmit the data frames with a granularity of one data symbol. Furthermore, the object is achieved by a network, preferably a real-time network, wherein the second subscriber is designed to instruct the first subscriber to pause the transmission of the data frames with a granularity of one data symbol. A delay in the forwarding and/or processing of the data frame can occur because the second subscriber has a slower clock than the first subscriber and thus the second subscriber receives data frames with a faster clock than said second subscriber can process/forward them. For example, there can also be a delay in the forwarding and/or processing of the data frame if the second subscriber receives data frames at several ports and is supposed to forward these data frames via an external port or process them an internal port.

In the context of the present invention, pausing or interrupting means stopping a frame (data frame or pause frame), wherein the frame continues unchanged after the pause/interruption. This means that a frame is divided into frame parts which, however, add up to the frame. For example, real-time networks configured according to the TSN IEEE 802.1Qbu standard do not pause/interrupt data frames, but rather break up data frames into smaller data frames, each of which is provided with a header. These smaller data frames are therefore not data frame parts, but rather independent data frames which contain part of the data symbols of the original data frame.

According to the invention, if there is a delay in the forwarding and/or processing of the data frame at the second subscriber, the transmission of the data frame from the first to the second subscriber can be paused immediately without having to end or discard the current data frame, whereby the data frame is divided into individual data frame parts, each comprising a number of data symbols. This division is not fixed in advance, but is carried out by the instruction of the second subscriber to pause the transmission of the data frame. The transmission can then be resumed by sending the remaining data frame part of the current data frame, wherein several pauses, i.e. a subdivision into several data frame parts, can also take place within a data frame. Furthermore, each data frame does not have to be planned individually and explicitly in advance, as is the case with known time-controlled real-time networks. Rather, the method according to the invention enables a self-regulating system with optimal utilization of the bandwidth. This results in low overhead and quick responsiveness in the data flow, while costs are kept low. A low latency can be achieved through the finely granular interruptibility of a data symbol, which is particularly advantageous when a plurality of subscribers is connected in series.

The second subscriber preferably buffers received data frames in a symbol buffer. The symbol buffer can be arranged downstream of a switch buffer (cut-through buffer or store-and-forward buffer) provided on the second subscriber.

Furthermore, if a predetermined upper level of its symbol buffer is exceeded, the second subscriber can instruct the first subscriber to pause the transmission of the data frames. Exceeding the upper level is therefore an indicator of a delay that occurs when forwarding and/or processing the data frame.

The first subscriber preferably continues to transmit the data frames after a pause period has elapsed. This is particularly advantageous in real-time networks which provide cyclic data communication, but can also be used in standard networks. The transmission of the data frames can be continued by means of a time-out after the pause period has elapsed. The pause period thus begins with the pause of the data frame and ends with the continuation of the data frame. As mentioned, the data frame can also be split into more than two data frame parts.

The second subscriber can instruct the first subscriber to continue to transmit the data frames. For example, if the symbol buffer falls below a predetermined lower level, the second subscriber can instruct the first subscriber to continue to transmit the data frames. If the level falls below the lower level (i.e. sufficient space is available in the symbol buffer), the second subscriber issues the instruction to the first subscriber to continue sending the data frame, with which further data symbols (i.e. a second data frame part) are received (and, if necessary, buffered or forwarded directly). This is particularly advantageous in standard networks (i.e. networks which are not real-time capable). In real-time networks, if the instruction sent by the second subscriber to the first subscriber to continue the transmission is lost, a non-calculable pause can occur without further measures.

The first subscriber preferably transmits a higher-priority frame to the second subscriber, which thereby pauses or interrupts the transmission of the data frames. After completion of the transmission of the higher-priority frame, the transmission of data frames is continued. There can be several higher-priority frames. Depending on the priority, a higher-priority frame can interrupt the transmission of a lower-priority frame.

Furthermore, a pause request can also be transmitted from the second subscriber to the first subscriber by a higher-priority frame.

Preferably, the pause frames or management frames are higher-priority frames.

The first subscriber preferably transmits a pause frame to the second subscriber while the transmission of the data frame is paused. This can be achieved by giving pause frames a higher priority than data frames, whereby a pause frame interrupts the data frame. The pause frame does not have to contain any special pause data and can be discarded by the receiving subscriber. As soon as the transmission of pause frames has ended, the transmission of the data frames is continued.

Source-synchronous real-time networks are known in which no clock is transmitted between subscribers. This is also the case with real-time networks whose subscribers are configured according to the newly developed X2X+protocol. In order to enable the subscribers to reconstruct the clock (clock data recovery—CDR) from the received frames (data frames and pause frames), 8B/10B encoded data are permanently transmitted in frames. Thus, in addition to data frames, pause frames are also preferably 88/10B encoded.

The second subscriber preferably instructs the first subscriber to send the pause frame by transmitting an active start-of-pause request. The second subscriber can instruct the first subscriber to end the sending of the pause frame by transmitting an end-of-pause request, preferably in a further cyclical management frame.

It is particularly advantageous, if the second subscriber transmits the active start-of-pause request (and/or, if provided, the end-of-pause request) to the first subscriber in a further cyclical management frame. A further management cycle is planned for the further management frame.

A further management frame is preferably sent from the second subscriber to the first subscriber at equidistant time intervals of the further management cycle. The further management frame can comprise management data which are used to manage communication between the subscribers. In particular, the further management frame can contain active start-of-pause requests (and/or, if provided, also end-of-pause requests) to the first subscriber with regard to further data frames sent by the first subscriber to the second subscriber.

For example, one bit can be provided in the further management frame as a start-of-pause request, and one bit for an end-of-pause request. The same bit can also be provided for a start-of-pause request and an end-of-pause request, wherein the bit can be set, for example, to '1' for the start-of-pause request and '0' for the end-of-pause request, or vice versa—the end-of-pause request can be synonymous with an inactive start-of-pause request.

The first subscriber preferably cyclically transmits a management frame to the second subscriber, wherein the first subscriber interrupts a transmission of data frames with a granularity of one data symbol, transmits the management frame to the second subscriber, and then continues to transmit the data frames. A management cycle is provided for the management frame. A management frame is sent at equidistant time intervals of the management cycle. The management frame can comprise management data which are used to manage communication between the subscribers. In particular, the management frame can contain start-of-pause requests (and/or optionally also end-of-pause requests) to the second subscriber with regard to further data frames sent by the second subscriber to the first subscriber.

If the first subscriber transmits a pause frame at the time of the management cycle, said first subscriber interrupts the transmission of the pause frame, transmits the management frame to the second subscriber, and then continues to transmit the pause frame. This means that the pause frame is paused while the management frame is being transmitted.

The management frame can therefore be given a higher priority than the pause frames and/or data frames.

The second subscriber preferably transmits data symbols in a further data frame to the first subscriber, wherein the first subscriber instructs the second subscriber to pause the transmission of the further data frame with a granularity of one data symbol, wherein after the pause, the second subscriber continues to transmit the further data frame. This means that further data frames which are transmitted from the second subscriber to the first subscriber can also be paused by instructions from the first subscriber to the second subscriber. The mechanisms can be used here as described in relation to the transmission of data frames from the first subscriber to the second subscriber.

In summary, the first/second subscriber can combine several logical channels (a data channel, a pause channel and a management channel) into a data stream, wherein data frames, pause frames and management frames are interleaved on the data connection. The management channel (i.e. the management frames) has the highest priority, the pause channel (i.e. the pause frames) has medium priority and the data channel (i.e. the data frames) has the lowest priority. A logical channel can be interrupted at any time by a logical channel with a higher priority.

Use of the method according to the invention is particularly advantageous in real-time networks in which a cyclical transmission of management frames for the exchange of time information between the subscribers is already provided. If, for example, an 8B/10B line encoding of the transmitted data is used, the transmitted data are scrambled in order to minimize effects on electromagnetic radiation.

If special control characters, so-called K symbols, are contained in the line code (as is the case with the newly developed X2X+protocol), an already defined "no operation" (NOp) K symbol can be used to act as a pause frame, so that a pause frame is only one NOp symbol long. Of course, several such pause frames could also be sent in succession in order to signal a longer interruption of the data frame. However, since K symbols are not scrambled, a pause frame composed of several NOp symbols would continuously produce the same bit sequences, which would generate disadvantageous electromagnetic radiation.

To avoid this, only the beginning and the end of a pause frame can be defined using K symbols. For example, the beginning of a pause frame can be defined by a start-of-pause identifier in the form of a K28.3 symbol and the end of a pause frame by an end-of-pause identifier in the form of a K28.4 symbol. The pause data sent between the start-of-pause identifier and the end-of-pause identifier then do not transport any actual information, but can be scrambled. Since the pause data of the pause frame have no relevant content in this embodiment, they can be discarded by the receiver.

Not only the pause frames but also the data frames and management frames can be defined using K symbols of the line coding. The beginning of a management frame can be defined by a start-of-management identifier, for example in the form of a K28.1 symbol, whereas an end of a management frame can be defined as an end-of-management identifier, for example in the form of a K28.0 symbol. Likewise, the beginning of a data frame can be defined as a start-of-frame identifier in the form of a K29.7 symbol and an end of a data frame can be defined by an end-of-frame identifier in the form of a K27.7 symbol.

If the start-of-pause request is transmitted in the management frame, a bit can be used in the header of the management frame. Alternatively, the management frame can also consist of a single symbol, which represents the start-of-pause request. This can minimize the overhead if it is not necessary in the network to transmit other management information in the management frame. A start-of-pause symbol can thus be defined, for example the K28.1 symbol, which in this case is not used as a start-of-management symbol. If the first subscriber receives such a start-of-pause symbol from the second subscriber as a start-of-pause request, then a pause frame is started.

If an end-of-pause request is provided, this can also be done using a defined end-of-pause symbol in a management frame.

In the newly developed X2X+protocol, for example, a management cycle of 4 µs is provided. This means that within a management cycle, i.e. between the sending of two management frames at a data transmission rate of 51.2 MSymbols/s, 204 data symbols can be transmitted. If these data symbols (one or more data frames) are all buffered in a symbol buffer, a management frame with a positive pause request must be sent after 204 data symbols have been received so that the symbol buffer does not overflow. The symbol buffer is preferably selected to be larger, however, since the symbol buffer can overflow shortly after the last management frame has been sent (with a negative pause request). The symbol buffer is preferably chosen to be twice, particularly preferably three times, as large as data symbols can be transmitted between two management frames.

The present invention is described in greater detail below with reference to FIG. 1 to 4, which show schematic and non-limiting advantageous embodiments of the invention by way of example. In the drawings.

Figure 1:
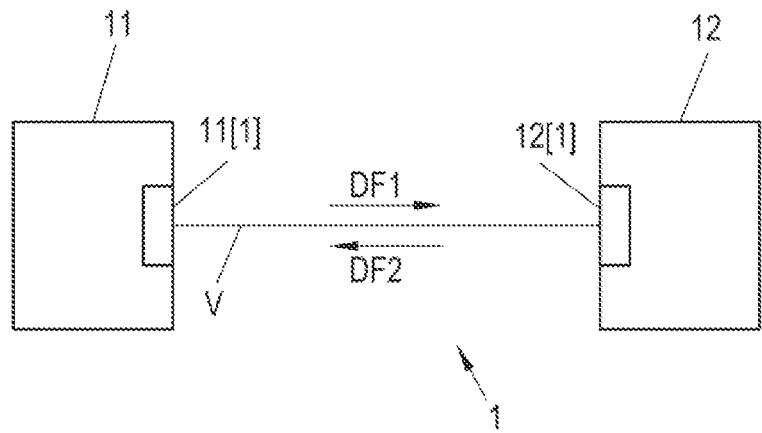
FIG. 1 shows a real-time network with two subscribers.

A network 1, in this case preferably configured as a real-time network, comprises a plurality of subscribers which are connected to one another in a linear or branched manner and wherein neighboring subscribers transmit frames with symbols to one another. If the network 1 is a real-time network, neighboring subscribers cyclically transmit frames with symbols to one another. FIG. 1 shows a network 1 with only one first subscriber 11 and one second subscriber 12. In order to transmit frames with symbols, at least one port 11[1], 12[1] is provided on each subscriber 11, 12. The ports 11[1], 12[1] are each configured to receive and send symbols in frames and are connected to one another via a data connection V.

Data frames DF1, DF2, each comprising a number of data symbols DS, are transmitted cyclically between the subscribers 11, 12. The first subscriber 11 thus transmits data frames DF1 via its port 11[1] and the data connection V to the port 12[1] of the second subscriber 12, which receives the data frames DF1, buffers them in whole (if a store-and-forward buffer is provided as a switch buffer) or in part (if a cut-through buffer is provided as a switch buffer) in an associated switch buffer (depending on the configuration, a cut-through buffer or store-and-forward buffer) and then processes/forwards them. Likewise, the second subscriber 12 transmits further data frames DF2 via its port 12[1] and the data connection V to the port 11[1] of the first subscriber 11, which receives the further data frames DF2, buffers them in whole or in part in an associated switch buffer and then processes/forwards them. Of course, the subscribers 11, 12 can also have additional ports, which in turn are connected to ports of additional subscribers via data connections.

Figure 2A:
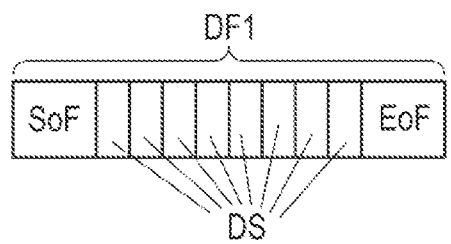
FIG. 2a shows a structure of a data frame by way of example.

Data frames DF1 sent by the first subscriber 11 and further data frames DF2 sent by the second subscriber 12 preferably, but not necessarily, have the same structure, each beginning with a start-of-frame identifier SoF and ending with an end-of-frame identifier EoF. Data symbols DS (in this case eight) are transmitted between the start-of-frame identifier SoF and the end-of-frame identifier EoF, as shown in FIG. 2a.

If the first subscriber 11 sends one or more data frames DF1 to the second subscriber, the second subscriber 12 is designed to instruct the first subscriber 11 to pause the transmission of the data frames DF1 with a granularity of one data symbol DS. This means that the transmission can also be interrupted in the middle of a data frame DF1 at the instruction of the second subscriber 12. The second subscriber 12 can then instruct the first subscriber 11 to continue the transmission of the data frame DF1. The data frame DF1 can thus be divided into a first data frame part DF1' transmitted first and a second data frame part DF1" transmitted later.

The transmission of the data frame DF1 can preferably be paused by sending a frame with a higher priority than the priority of the data frame DF1.

Figure 2B:
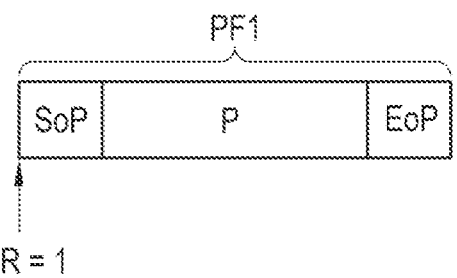
FIG. 2b shows a structure of a pause frame by way of example.

The first subscriber 11 preferably transmits a pause frame PF1 via the data connection V to the second subscriber 12 while the transmission of the data frame DF1 is paused. The pause frame PF1 preferably starts with a start-of-pause identifier SoP and ends with an end-of-pause identifier EoP. Pause data P are transmitted between the start-of-pause identifier SoP and the end-of-pause identifier EoP, as shown in FIG. 2b.

The start of the pause frame PF1 can be requested by the second subscriber 12, for example by transmitting a start-of-pause request PR=0/1 (PR=1 represents an "active" start-of-pause request, PR=0 represents an "inactive" start-of-pause request) to the first subscriber 11. The end of the pause frame PF1 takes place advantageously in this case after the pause period tp has elapsed. However, the end of the pause frame PF1 can also be instructed by the second subscriber 12, for example by transmitting an end-of-pause request PER. The pause data P can be discarded by the first subscriber 11.

A simultaneous data transmission (including the start-of-pause request PR=0/1) from the second subscriber 12 to the first subscriber is explained below.

Figure 3:
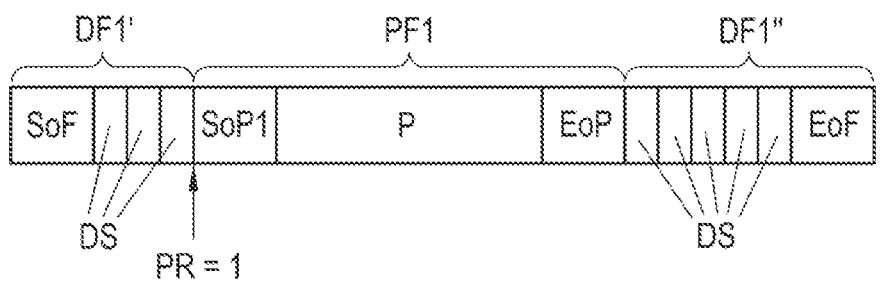
FIG. 3 shows a data frame which is interrupted by a pause frame.

FIG. 3 shows a transmission of a data frame DF1 with eight data symbols DS from a first subscriber 11 to a second subscriber 12, wherein the data frame DF1 is interrupted and thus paused by a pause frame PF1. The first subscriber 11 starts to transmit the data frame DF1 to the second subscriber 12 with a start-of-frame identifier SoF, followed by three data symbols DS (first data frame part DF1'). The data frame DF1 is then interrupted by an active start-of-pause request PR=1 from the second subscriber 12, whereby a pause frame PF1, beginning with a start-of-pause identifier SoP, is sent. After the start-of-pause identifier SoP, pause data P are basically transmitted until the pause frame PF1 is ended with an end-of-pause identifier EoP (or, if provided, is interrupted by a management frame MF1, see below).

The end of the pause frame PF1 occurs preferably after the pause period td has elapsed. The pause period td can be set, for example, to be equivalent to the duration of the transmission of a number of symbols, for example data symbols DS (e.g. 204 symbols). However, the end of the pause frame PF1, like the start of the pause frame PF1, can also be triggered by the second subscriber 12. To this end, the second subscriber can transmit an end-of-pause request to the first subscriber 11.

The second data frame part DF1" of the data frame DF1, i.e. five further data symbols DS in this case, is then transmitted and ended with an end-of-frame identifier EoF. The data frame DF1 was thus interrupted by the pause frame PF1 into a first data frame part DF1' and a second data frame part DF1". Additional data frames DF1 can then be transmitted from the first subscriber 11 to the second subscriber 12.

The second subscriber 12 preferably buffers received data symbols DS in whole or in part in a symbol buffer and instructs the first subscriber 11 to interrupt the transmission of data frames DF1 when a predetermined upper level of the symbol buffer is exceeded, for example by transmitting an active start-of-pause request PR=1 to the first subscriber 11. In addition, the second subscriber 12 can transmit an end-of-pause request PER to the first subscriber 11 in the event that the symbol buffer falls below a predetermined lower level, if the symbol buffer of the second subscriber 12 has been sufficiently processed so that the symbol buffer can again accommodate data symbols DS.

The continuation of the transmission of data frames DF1 by the first subscriber 11 to the second subscriber 12 can take place, for example, after a pause period td has elapsed and/or by transmitting an end-of-pause request PER to the first subscriber 11.

Figure 4:
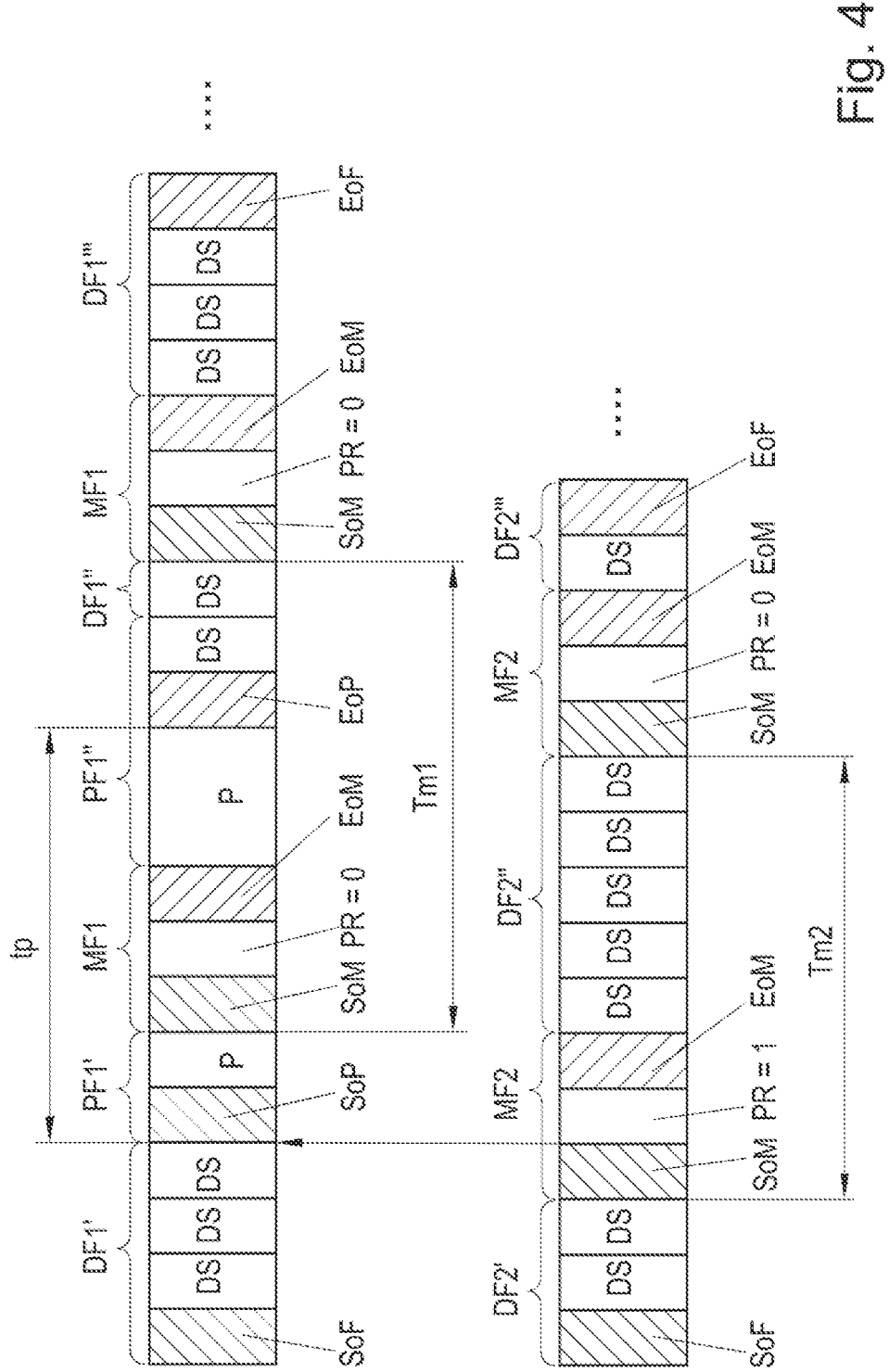
FIG. 4 shows the transmission of data frames between the first subscriber and the second subscriber.

The start-of-pause request PR=0/1 (and optionally the end-of-pause request PER) can be transmitted from the second subscriber 12 to the first subscriber 11, for example in a further management frame MF2 sent cyclically in a further management cycle Tm2. Likewise, the first subscriber 11 can cyclically transmit a management frame MF1 to the second subscriber 12, which can also include a start-of-pause request PR=0/1 (and optionally the end-of-pause request PER) in order to interrupt (and optionally to continue) further data frames DF2 sent by the second subscriber 12 to the first subscriber 11 (in the case of an active start-of-pause request PR=1). To describe this interaction. FIG. 4 shows a transmission of a data frame DF1 from the first subscriber 11 to the second subscriber 12 and a simultaneous transmission of a further data frame DF2 from the second subscriber 12 to the first subscriber 11.

Both—the pause frame PF1 and the management frame MF1—are used in FIG. 4, for example, as frames with a higher priority. However, it is also possible that other higher-priority frames are used in the method according to the invention.

The data frame DF1 is transmitted from the first subscriber 11 to the second subscriber 12, beginning with the start-of-frame identifier SOF. After receiving three data symbols DS, the first subscriber 11 is instructed by the second subscriber 12 to interrupt the transmission of the data frame DF1. This instruction is shown here as an active start-of-pause request PR=1 transmitted in a further management frame MF2 (arrow pointing upwards). Thus, only the first data frame part DF1' of the data frame DF1 is transmitted until the pause.

Figure 2C:
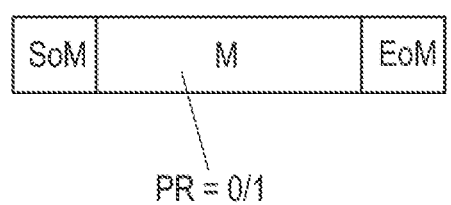
FIG. 2c shows a structure of a management frame by way of example.

The first subscriber 11 then sends a pause frame PF1, which basically starts with a start-of-pause identifier SoP, followed by pause data P, and ends with an end-of-pause identifier EoP, as already shown in FIG. 2b. However, the first subscriber 11 also cyclically transmits a management frame MF1 to the second subscriber 12 (with a first management cycle Tm1), which starts with a start-of-management identifier SoM and ends with an end-of-management identifier EoM. Such a management frame MF1 is shown in FIG. 2c.

Management data M are optionally transmitted between the start-of-management identifier SoM and the end-of-management identifier EoM, wherein only a start-of-pause request PR=0/1 is shown as management data M in FIG. 4. The start-of-pause request PR=0/1 is preferably transmitted by a specific bit, which is set or not set, in the management frame MF. The management frame MF1 can interrupt both pause frames PF1 and data frames DF1, so it has a higher priority than pause frames PF1 and data frames DF1. In FIG. 4, the pause frame PF1 is interrupted by the management frame MF1. Although the start-of-pause identifier SoP and some pause data PF' are transmitted to the second subscriber 12, the start-of-management identifier SoM is then transmitted to the second subscriber 12, followed by management data (in this case an inactive start-of-pause request PR=0) and the end-of-management identifier EoM. After the transmission of the management frame MF1, the previously interrupted pause frame PF1 is continued seamlessly. Any further pause data P are then sent, i.e. the pause data PF1" in FIG. 4.

The pause frame PF1 is ended after the pause period td with an end-of-pause identifier EoP and the previously interrupted data frame DF1 is then continued, i.e. in this case the second data frame part DF1" of the data frame DF1 is transmitted.

The data frame DF1 is, however, interrupted one more time in accordance with FIG. 4, for example. Since a first management cycle Tm1 has elapsed, a management frame MF1 with a start-of-management identifier SoM is started again. Management data M (in this case again comprising an inactive start-of-pause request PR=0) are then transmitted to the second subscriber 12, whereupon the management frame MF1 is ended again with an end-of-management identifier EoM. The data frame DF1 is then continued again, i.e. the third data frame part DF1'" is sent to the second subscriber 12 and ended with an end-of-frame identifier EoF. The entire data frame DF1 has thus been transmitted from the first subscriber 11 to the second subscriber 12. The next data frame DF1 can then be transmitted from the first subscriber 11 to the second subscriber 12.

In parallel with the transmission of the first data frame DF1 from the first subscriber 11 to the second subscriber 12, a further data frame DF2 is transmitted from the second subscriber 12 to the first subscriber 11. The further data frame DF2 begins with a start-of-frame identifier SoF, whereupon the (in this case eight) data symbols DS follow. The data frame DF2 is, however, interrupted by a management frame MF2 after two data symbols DS, with which only a first further data frame part DF2' of the further data frame DF2 is transmitted initially. The interruption of the further data frame DF2 by the management frame MF2 also takes place here with a granularity of one data symbol DS. The further management frame MF2 starts with a start-of-management identifier SoM, whereupon management data M follow. The management data M here include an (active) start-of-pause request PR=1, for example because the symbol buffer of the second subscriber 12 is full or has exceeded a predetermined upper level of the symbol buffer. The second subscriber 12 thus instructs the first subscriber 11 to interrupt the data frame DF1 with the pause frame PF1 (arrow pointing upwards), as described above. After the further management frame MF2 has been terminated by the end-of-management identifier EoM, further (in this case five) data symbols DS are sent.

Since the management data M of the management frame MF1 of the first subscriber 11 do not contain an active start-of-pause request PR=1 (but an inactive start-of-pause request PR=0), the second subscriber 12 is not instructed to interrupt the further data frame DF2 with a further pause frame PF2. The further data frame DF2 is, however, interrupted again by a management frame MF2 after the transmission of a second further data frame part DF2", since the further management cycle Tm2 has expired. The further management frame MF2 does not contain an active start-of-pause request PR=1 (but an inactive start-of-pause request PR=0), which is why the first subscriber 11 is not instructed to interrupt the data frame DF1 (i.e. in this case the second frame part DF1") again with a pause frame PF1.

After the further management frame MF2 has again been ended by the end-of-management identifier EoM, the further data frame DF2 is continued, which in this case will correspond to a third further data frame part DF2'" in the form of a data symbol DS. Since the management data M of the second management frame MF1 (like the first management frame MF1) of the first subscriber 11 do not contain an active start-of-pause request PR=1 (but an inactive start-of-pause request PR=0), the second subscriber 12 is not instructed to interrupt the further data frame DF2 with a further pause frame PF2.

The further data frame DF2 is ended with an end-of-frame identifier EoF. The transmission of the further data frame DF2 (divided into a first, second and third further data frame part DF2', DF2", DF2"') is thus fully completed. The next further data frame DF2 can then be transmitted from the second subscriber 12 to the first subscriber 11, although this is not shown.

Although the figures only show data transmission between two subscribers 11, 12 of a network 1, the method described can of course also be applied to communication between a plurality of subscribers in a network.

The invention claimed is:

1. A network comprising:
a first switch designated as a first subscriber; and
a second switch designated as a second subscriber connected to the first subscriber via a data connection,
wherein the first subscriber is designed to transmit data frames, which contain data symbols, to the second subscriber via the data connection,
wherein the second subscriber is designed to instruct the first subscriber to pause the transmitting of the data frames with a granularity of one data symbol, whereby the transmitting of a data frame is paused between successive first and second data symbols within the data frame, and wherein after the pause, the first subscriber is designed to continue the transmission of the data frames with a granularity of one data symbol, whereby the transmitting of the data frame continues from between the successive first and second data symbols within the data frame.

2. The network according to claim 1, wherein the second subscriber comprises a symbol buffer for buffering received data frames.

3. The network according to claim 1 is a real-time network.

* * * * *